US006523715B1

(12) United States Patent
Dunford et al.

(10) Patent No.: US 6,523,715 B1
(45) Date of Patent: Feb. 25, 2003

(54) HOT FOOD VENDING MACHINES

(75) Inventors: Bruce Dunford, Wimborne (GB); Phillip John Sibley, Dorchester (GB)

(73) Assignee: Food Service Technology Limited (GB)

( * ) Notice: Subject to any disclaimer, the term of this patent is extended or adjusted under 35 U.S.C. 154(b) by 0 days.

(21) Appl. No.: 09/786,229

(22) PCT Filed: Jun. 26, 2000

(86) PCT No.: PCT/GB00/02486

§ 371 (c)(1),
(2), (4) Date: Jun. 12, 2001

(87) PCT Pub. No.: WO01/16904

PCT Pub. Date: Mar. 8, 2001

(30) Foreign Application Priority Data

Jul. 1, 1999 (GB) .......................................... 9915336

(51) Int. Cl.[7] .......................................... B65G 59/00

(52) U.S. Cl. ...................... 221/121; 221/123; 221/133; 221/150 R; 221/150 HC; 221/236

(58) Field of Search ........................... 221/82, 83, 91, 221/150 R, 150 HC, 292, 287, 236, 119, 121, 123, 133; 99/357; 219/214

(56) References Cited

U.S. PATENT DOCUMENTS 4,592,485 A * 6/1986 Anderson et al. ..... 221/150 HC
5,067,630 A * 11/1991 Nesser et al. ............... 221/287
5,144,879 A * 9/1992 Alessi .................... 221/150 A
5,522,310 A * 6/1996 Black et al. .......... 221/150 HC
5,605,249 A * 2/1997 Gonyea ...................... 221/121
5,772,072 A * 6/1998 Prescott et al. ............. 221/121

FOREIGN PATENT DOCUMENTS

NL 8801951 * 3/1990

* cited by examiner

*Primary Examiner*—H. Grant Skaggs
(74) *Attorney, Agent, or Firm*—Gifford, Krass, Groh, Sprinkle, Anderson & Citkowski, P.C.

(57) ABSTRACT

A mechanism for removing selected food containers from a carousel situated in the refrigerated food storage compartment of an automatic hot food vending machine consisting of a rotatable selector plate which forms the bottom of the carousel and food containers can be removed from the refrigerated food storage compartment.

6 Claims, 2 Drawing Sheets

HOT FOOD VENDING MACHINES

Figure 1:
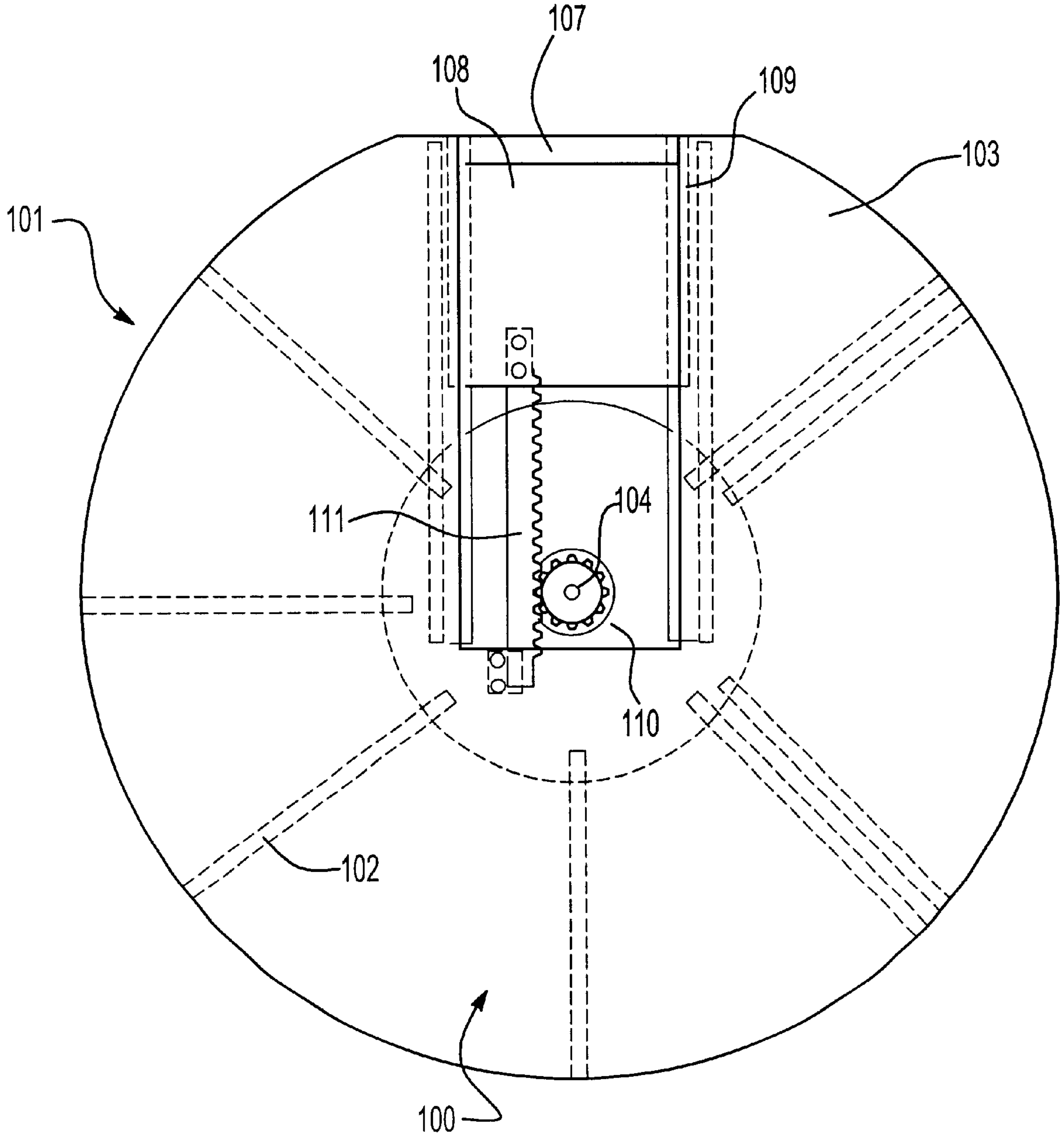

The present invention relates to vending machines for supplying hot, cooked food. Vending machines for dispensing hot foods include a refrigerated storage compartment for uncooked, or at least partially cooked, food in individual containers, an oven, which for speed in heating usually is of the microwave type, means for retrieving containers of selected foods from the refrigerated storage compartment, placing them in the oven, removing them from the oven when cooked or reheated and dispensing the cooked or reheated meals, still in the containers. Usually there is included also means for dispensing condiments appropriate to any selected meal. The present invention relates specifically to a mechanism for retrieving the containers of food from the food storage compartment of a hot food vending machine.

Specifications EP O 437 344, EP 0 592 255 and U.S. Pat. No. 5,210,387 disclose hot food vending machines in which portions of food are held in plastic containers within cardboard sleeves. The containers and sleeves are stored in stacks in a refrigerated compartment from the top of which a selected container is removed vertically via a hole in a selector plate. The selected food container is placed on a conveyor and transported to a loading station at which the container is loaded into an oven by means of a ram which passes through the sleeve and is then withdrawn. After the food cooking cycle has been completed, the hot food container is withdrawn from the oven by a rake which also causes the food container to re-enter the sleeve before being conveyed to a dispensing station.

Specification U.S. Pat. No. 5,210,387 discloses a hot food vending machine which, among other features, includes a refrigerated compartment for the storage of pre-packed food to be dispensed by the machine. In the refrigerated compartment there is a number of vertical stacks for food containers. Across the top of the food container stacks there is an apertured and a mechanism for removing a selected food container from the refrigerated compartment and delivering it to an oven for cooking or heating. Each of the vertical stacks for food containers includes a mechanically operated mechanism which raises a container of a selected food to the level of the apertured plate whence it is picked up by a transfer mechanism and moved to a cooking point. The whole mechanism is cumbersome and complicated, involving as it does, chain drives, lead screw drives and pneumatic mechanisms. Moreover, there is a tendency for the food containers to be stuck together by ice, which has to be overcome by the container picker and transfer mechanism.

It is an object of the present invention to provide an improved apparatus for removing food containers from a refrigerated storage compartment forming part of an automatic hot food vending machine.

According to the present invention there is provided an apparatus for selectively removing packaged foodstuffs from a refrigerated storage compartment forming part of an automatic hot food vending machine, comprising a carousel having a plurality of compartments for food containers, a rotatable selector plate forming the bottom of the carousel, a door in the selector plate of a size sufficient to allow the passage of a food container therethrough, means responsive to a customer operated food selector to rotate the selector plate to a position such that the door in the selector plate is located within a compartment of the carousel containing that food, means for opening the door in the selector plate when it is in an appropriate position so as to permit a food container filled with that food to pass through the door in the selector plate into a receptacle for conveyance to a delivery hatch also in the refrigerated compartment.

Preferably, there is included an elevator table adapted to receive the food container and lower it through a delivery hatch in the bottom of the refrigerated storage compartment in which the carousel is situated and the selector plate includes an insulated portion which, after the elevator table has been lowered to remove the food container from the refrigerated storage compartment, is positioned to cover the delivery hatch in the bottom of the refrigerated storage compartment.

Figure 2:
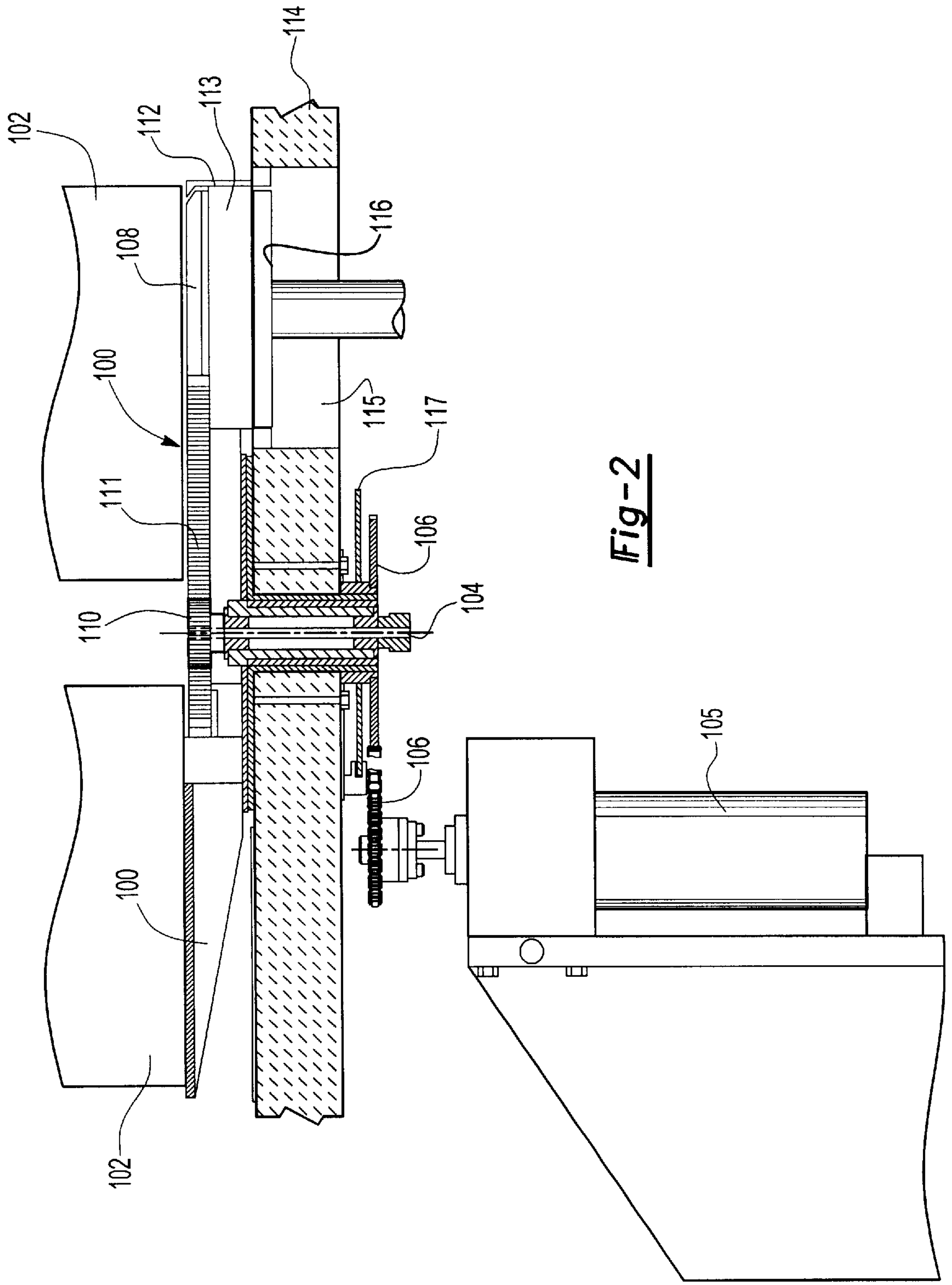

The invention will now be described, by way of example, with reference to the accompanying drawings, in which FIG. 1 is a plan view of an embodiment of the drawings; and FIG. 2 is a part sectioned elevation of the embodiment of the invention.

Referring to FIGS. 1 and 2, a selector plate 100 forms the bottom of a carousel 101, only a portion of which is shown. The carousel 101 has a number of regularly spaced longitudinal vanes 102 which form compartments 103 for standardised pre-packed containers for food to be dispensed from an automatic hot food vending machine of which the carousel forms part. The remainder of the machine is not shown in the drawing.

The selector plate 100 is mounted on an axle 104 and can be rotated via an electric motor 105 and chain drive system 106 and has formed in it a hole 107 of a size sufficient to allow the passage of a food container through it, which is closed by a sliding door 108. The door 108 is moved in runners 109 by a rack and pinion mechanism 110, 111. The hole 107 in the selector plate 100 has downwardly extending walls 112 which form a receptacle 113 for a selected food container which has passed through the hole 107 in the selector plate 100. The bottom of the receptacle 113 is formed by the top surface of an insulated base member 114 of a refrigerated storage compartment of the vending machine in which the carousel 100 is situated. The base member 114 of the storage compartment has a delivery hatch 115 formed in it. A vertically moveable table 116 which forms part of a mechanism for delivering food containers to an oven unit (not shown) is situated in the delivery hatch 115. Normally the table 116 is positioned with its upper surface approximately flush with the top surface 114 of the base member 114 of the refrigerated storage compartment.

In use, the selector plate 100 is rotated in response to signals from a customer operated food selector pad on the casing of the vending machine until the door 108 is situated about twenty degrees before the compartment 103 of the carousel 100 in which containers with the appropriate food in them are stored. The door 108 is then opened, the continued rotation of the selector plate 100 allowing the bottom food container to pass through into the receptacle 113 when the door aperture and compartment 103 of the carousel are in juxtaposition. The selector plate 100 is rotated further until the food container is positioned upon the table 116. The table 116 is then lowered through the base member 114 of the storage compartment, to remove the food container therefrom prior to its delivery to the oven for the heating or cooking of the food contained within it.

After the table 116 has been lowered to its delivery position the door 108 is closed and the selector plate 100 is rotated by a further amount so as to bring an insulated portion (not shown in the drawing) into juxtaposition with the delivery hatch 115 so as to minimise the heat loss through the delivery hatch 115.

The positioning of the selector plate 100 is controlled by markings on an index plate 117 positioned below the selector plate 100 outside the base member 114 of the freezer cabinet, which are read by an optical sensor (not shown in the drawing) and relayed to a central machine controller (also not shown in the drawing).

Alternatively, the positioning of the selector plate 100 could be controlled by limit switches, a direct stepping motor and controller, a Genera drive mechanism, or other suitable mechanism.

In order to facilitate the re-loading of the carousel, it too is rotatable about the same axis as the selector plate 100.

The invention has a number of advantages over the food storage system disclosed in specification U.S. Pat. No. 5,210,387, among which are:

a) the reduction of moving parts which are situated in the refrigerated compartment.

b) the continual motion of the selector plate tends to agitate the stacks of food containers, so reducing any tendency for the food containers to stick together, particularly in the case of the less popular items which may be stored for an appreciable period of time before use, and c) gravity aids the separation of selected food containers from the respective stack of food containers.

What is claimed is:

1. An apparatus for selectively removing packaged foodstuffs from a refrigerated storage compartment forming part of an automatic hot food vending machine, the said apparatus comprising:

a carousel having a plurality of compartments for storing food containers containing food;

a selector plate rotatably mounted with respect to the said carousel and defining a base of the carousel;

a door means in the said selector plate for opening and closing an opening in the said plate to allow the passage of a food container from a respective compartment therethrough;

a controls means responsive to a customer operated food selector to rotate the said selector plate with respect to the said carousel to a position such that the said door in the said selector plate is aligned in register with a respective compartment of the said carousel; and, an actuator means for opening the said door when the said selector plate is in register with the said respective compartment, whereby a respective food container passes through the said opening in the selector plate for conveyance from the refrigerated compartment.

2. Apparatus as claimed in claim 1 further comprising a receptacle for receiving a respective food container as it passes through the said opening.

3. Apparatus as claimed in claim 2 wherein the said receptacle is formed by downwardly projecting walls of the said door opening and an adjacent surface of a base member of the said refrigerated compartment.

4. Apparatus as claimed in claim 3 further comprising a delivery opening formed in the said base member of the said refrigerated compartment; and a table means located and movable with respect to the said delivery opening, whereby the said table means is adapted to receive a respective food container from the said receptacle and lower it through the said base member of the refrigerated compartment for conveyance to an oven loading means of the said hot food vending machine.

5. An apparatus as claimed in claim 1 wherein the said selector plate comprises a thermally insulated portion; and the said apparatus further comprising a positioning means for positioning the said insulated portion of the said selector plate in register with the said delivery opening during non-vending periods.

6. Apparatus as claimed in claim 1 wherein the said carousel is rotatably mounted about a common axis with the selector plate, thereby to facilitate the re-stocking of the carousel.

* * * * *